(12) United States Patent
Forget et al.

(10) Patent No.: US 12,384,058 B2
(45) Date of Patent: Aug. 12, 2025

(54) SIGNAL TRANSMISSION DEVICE FOR ARTICULATED MECHANISM

(71) Applicant: KINOVA INC., Boisbriand (CA)

(72) Inventors: Jean-François Forget, Montreal (CA); Nicolas Frigon, Laval (CA)

(73) Assignee: KINOVA INC., Boisbriand (CA)

( * ) Notice: Subject to any disclaimer, the term of this patent is extended or adjusted under 35 U.S.C. 154(b) by 72 days.

(21) Appl. No.: 18/260,544

(22) PCT Filed: Jan. 7, 2022

(86) PCT No.: PCT/CA2022/050013
§ 371 (c)(1),
(2) Date: Jul. 6, 2023

(87) PCT Pub. No.: WO2022/147619
PCT Pub. Date: Jul. 14, 2022

(65) Prior Publication Data
US 2024/0051157 A1 Feb. 15, 2024

Related U.S. Application Data

(60) Provisional application No. 63/135,122, filed on Jan. 8, 2021.

(51) Int. Cl.
*B25J 19/00* (2006.01)
(52) U.S. Cl.
CPC ....... *B25J 19/0033* (2013.01); *B25J 19/0041* (2013.01)
(58) Field of Classification Search
CPC .......................... B25J 19/0029; B25J 19/0041
See application file for complete search history.

(56) References Cited

U.S. PATENT DOCUMENTS 7,559,590 B1 * 7/2009 Jones ............... B25J 19/0041
901/29
9,713,247 B2 * 7/2017 Lida ..................... H05K 1/025
(Continued)

FOREIGN PATENT DOCUMENTS

| CA | 3100992 A1 | 10/2018 | |
|---|---|---|---|
| DE | 102019120116 A1 * | 1/2021 | .......... B25J 19/0029 |
| KR | 20120008743 | 2/2012 | |

*Primary Examiner* — Jake Cook
(74) *Attorney, Agent, or Firm* — NORTON ROSE FULBRIGHT CANADA LLP (57) ABSTRACT

A robotic arm having at least pair of structural members rotatably coupled to one another, with a first one of the structural members defining a central passage. A communications link is at least partially within the robotic arm for signal transmission between within the robotic arm. The communications link includes a signal transmission device having a coiled portion, with ends of the coiled portion adapted to be connected to parts of the communications link, whereby the coiled portion is a segment of the communications link. The coiled portion has one of its ends connected to the second one of the structural members to rotate with the second one of the structural members, the other of the ends of the coiled portion connected to a component associated with the first one of the structural members through the central passage to rotate with the first one of the structural members, at least a portion of the coiled portion expanding or contracting radially during relative rotation between the pair of structural members.

19 Claims, 4 Drawing Sheets

(56) References Cited

U.S. PATENT DOCUMENTS

| | | | |
|---|---|---|---|
| 10,913,165 B1* | 2/2021 | Jonas | B25J 19/0041 |
| 11,147,731 B2* | 10/2021 | Varghese | B25J 9/0006 |
| 11,305,438 B2* | 4/2022 | Yamazaki | B25J 9/1674 |
| 11,331,816 B2* | 5/2022 | Muneto | B25J 19/0029 |
| 12,103,180 B2* | 10/2024 | Sansfaçon et al. | H02K 21/24 |
| 12,109,694 B2* | 10/2024 | Kastler | G02B 6/3874 |
| 2013/0270399 A1* | 10/2013 | Berkowitz | B25J 19/0029 |
| | | | 248/65 |
| 2015/0114162 A1 | 4/2015 | Kirihara et al. | |
| 2015/0128748 A1 | 5/2015 | Rueb | |
| 2019/0118316 A1* | 4/2019 | Takahara | B23Q 17/2241 |
| 2020/0361081 A1 | 11/2020 | Caron L'Ecuyer et al. | |
| 2022/0118634 A1* | 4/2022 | Pfister | B25J 9/102 |
| 2023/0249367 A1* | 8/2023 | Radin-Macukat | B25J 19/0029 |
| | | | 74/490.02 |

\* cited by examiner

SIGNAL TRANSMISSION DEVICE FOR ARTICULATED MECHANISM

CROSS-REFERENCE TO RELATED APPLICATION

The present application claims the priority of U.S. Patent Application No. 63/135,122, filed on Jan. 8, 2021 and incorporated herein by reference.

TECHNICAL FIELD

The present application relates to the field of robotics involving mechanisms such as articulated mechanisms and robot arms and to signal transmission through such articulated mechanisms.

BACKGROUND OF THE ART

Robotic arms are increasingly used in a number of different applications, from manufacturing, to servicing, and assistive robotics, among numerous possibilities. In robotic arms, body members (also known as links) may be interconnected by motorized joints, the body members respectively connected to opposite rotating parts of a motorized joint.

Due to the relative rotation between links of a robotic arm, various systems have been devised for signal transmission along the robotic arm, for instance to control the motorized joints. For example, slip rings are used as an interface between the adjacent links. It is however known that slip rings may be exposed to degradation due to inherent friction. Moreover, the limited signal transmission capacity through slip rings is such that some industrial robots communicate internally with low-speed buses only meant for robot control. Consequently, there is a limit on the types of tooling and sensors that may be connected at the end effector of robot arms. In some instances, it may be required that externally-run wires be used. These wires may be difficult to rigidly fix, difficult to keep clean, may be prone to damage, and may reduce the range of motion of the robot by introducing an artificial constraint.

SUMMARY

It is an aim of the present disclosure to provide a mechanism such as a robot arm that addresses issues related to the prior art.

Therefore, in accordance with a first aspect of the present disclosure, there is provided a robotic arm comprising: at least pair of structural members rotatably coupled to one another, with a first one of the structural members defining a central passage; a communications link at least partially within the robotic arm for signal transmission between within the robotic arm, the communications link including a signal transmission device having a coiled portion, with ends of the coiled portion adapted to be connected to parts of the communications link, whereby the coiled portion is a segment of the communications link, wherein the coiled portion has one of its ends connected to the second one of the structural members to rotate with the second one of the structural members, the other of the ends of the coiled portion connected to a component associated with the first one of the structural members through the central passage to rotate with the first one of the structural members, at least a portion of the coiled portion expanding or contracting radially during relative rotation between the pair of structural members.

Further in accordance with the aspect, for example, the second one of the structural members defines a receptacle, the coiled portion being received in the receptacle.

Still further in accordance with the aspect, for example, at least one tab projects from a wall of the receptacle to hold the coiled portion captive in the receptacle.

Still further in accordance with the aspect, for example, one of the ends of the coiled portion is fixed to a wall of the receptacle.

Still further in accordance with the aspect, for example, the signal transmission device has a ribbon cable construction.

Still further in accordance with the aspect, for example, the communications link has one or more data communication buses enabling data communication at rates from 10 mbit/sec to 20 gbit/sec inclusively.

Still further in accordance with the aspect, for example, the communications link includes Ethernet signal transmission.

Still further in accordance with the aspect, for example, the communications link includes USB signal transmission.

Still further in accordance with the aspect, for example, the communications link includes Ethercat signal transmission.

Still further in accordance with the aspect, for example, the coiled portion is impedance controlled actively or passively.

Still further in accordance with the aspect, for example, the signal transmission device includes an elongated portion extending from one of the ends of the coiled portion into the central passage, the elongated portion having an end fixed in rotation to the first one of the structural members.

Still further in accordance with the aspect, for example, the elongated portion and the coiled portion have a continuous integral ribbon cable construction.

Still further in accordance with the aspect, for example, the coiled portion lies in a plane, and the elongated portion extends from the coiled portion in a direction normal to the plane.

Still further in accordance with the aspect, for example, the coiled portion lies in a plane, and wherein an axis of rotation between the pair of structural members is normal to the plane.

Still further in accordance with the aspect, for example, a PCB is fixed to the second one of the structural members and is communicatively connected to the coiled portion.

Still further in accordance with the aspect, for example, the communications link includes a sequence of PCB-signal transmission device-PCB-cable-PCB-signal transmission device-PCB-cable- . . . .

Still further in accordance with the aspect, for example, a window is defined in a cover plate on one of the structural members to monitor the coiled portion.

Still further in accordance with the aspect, for example, the communications link includes at least one of a repeater, an amplifier, a switch.

Still further in accordance with the aspect, for example, a curve radius of the coiled portion is between 12 mm and 30 mm.

Still further in accordance with the aspect, for example, the communications link has a high speed communication port or connector at an end effector interface.

Still further in accordance with the aspect, for example, the high speed communication port or connector is wired internally.

Still further in accordance with the aspect, for example, the high speed communication port or connector is a RJ45 connector.

Still further in accordance with the aspect, for example, the high speed communication port or connector uses centrally-oriented and reversible spring-loaded connectors adapted for communication with an end effector.

Still further in accordance with the aspect, for example, the high speed communication port or connector is a M8 connector.

Still further in accordance with the aspect, for example, the high speed communication port or connector is a M12 connector.

Still further in accordance with the aspect, for example, the coiled portion allows for rotational movement between the pairs of structural members of at least one complete revolution.

In accordance with another aspect of the present disclosure, there is provided a robotic arm comprising: at least pair of shells rotatably coupled to one another, with a first one of the shells defining a central passage, and a second one of the shells defining a receptacle; a signal transmission device having an elongated portion and a coiled portion, with connectors at the end of the elongated portion and at the end of the coiled portion, wherein the elongated portion extends through the central passage, and the connector at the end of the elongated portion rotating with the first one of the shells, wherein the coiled portion is received in the receptacle, the connector at the end of the coiled portion rotating with the second one of the shells, the coiled portion expanding or contracting diametrically during relative rotation between the pair of shells.

In accordance with another aspect of the present disclosure, there is provided a robotic arm comprising: at least pair of shells rotatably coupled to one another, with a first one of the shells defining a central passage, and a second one of the shells defining a receptacle; a signal transmission device having a coiled portion, with connectors at the ends of the coiled portion, wherein the coiled portion is received in the receptacle, the connector at one end of the coiled portion rotating with the second one of the shells, the connected at the other end of the coiled portion connected to a component associated with the first one of the shells, the coiled portion expanding or contracting diametrically during relative rotation between the pair of shells.

DETAILED DESCRIPTION

Figure 1:
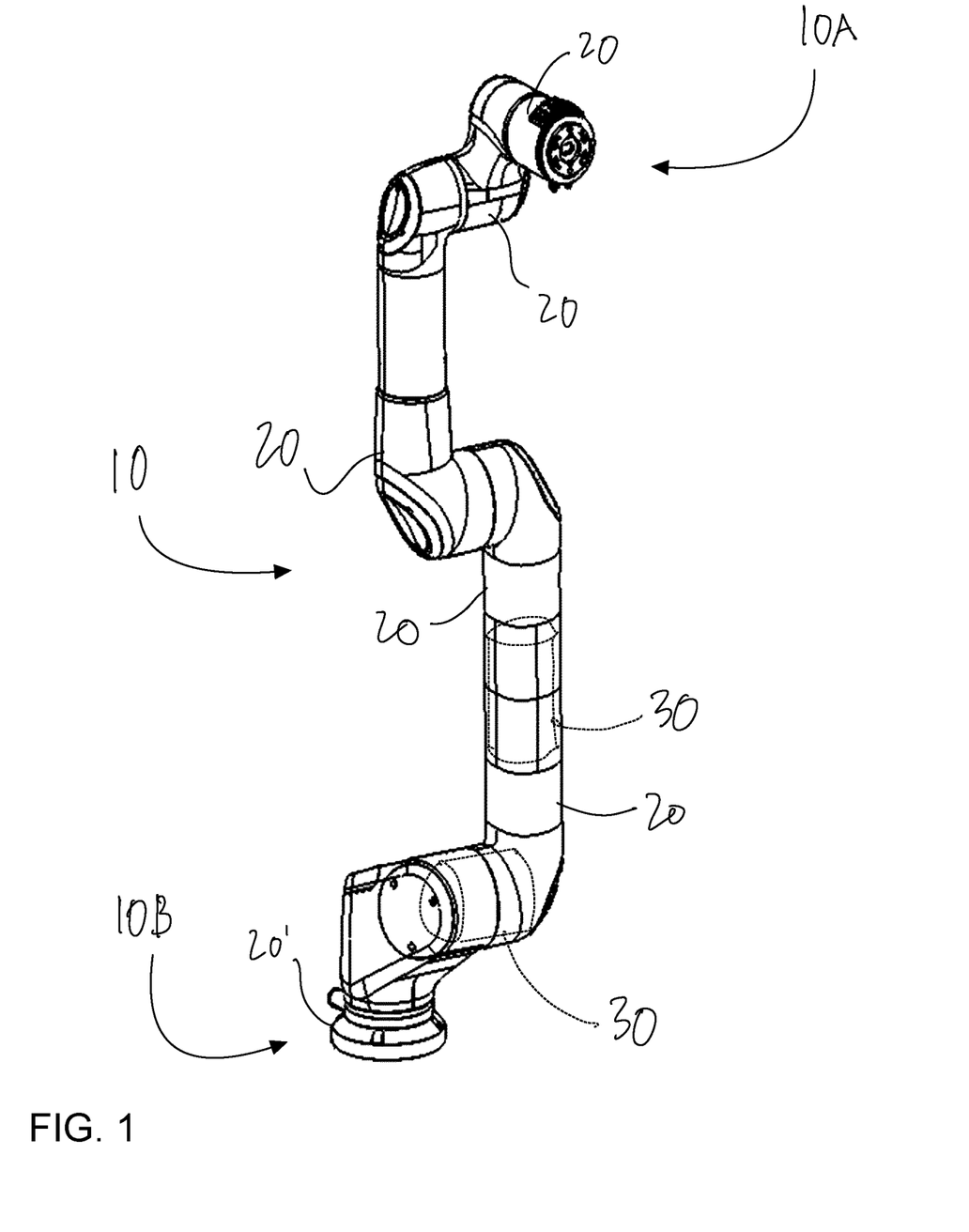
FIG. 1 is a perspective view of an articulated robot arm in accordance with an embodiment of the present disclosure.
Figure 2:
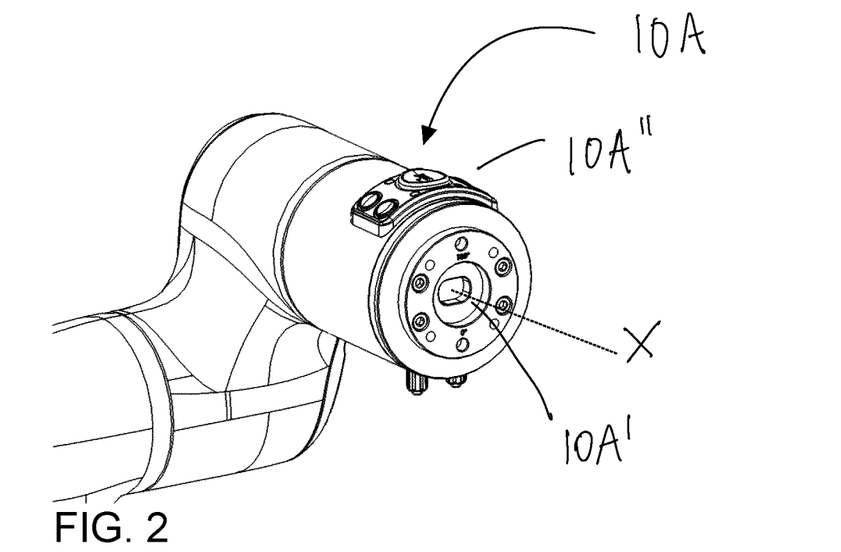
FIG. 2 is a perspective view of an exemplary effector end of the articulated robot arm of FIG. 1.

Referring to the drawings and more particularly to FIG. 1, a mechanism such as a robot arm in accordance with the present disclosure is generally shown at 10, and is also referred to as an articulated robotic arm or robotic arm, etc. The robot arm 10 shown is of the type displacing an end effector is 6 degrees of freedom, though fewer or more degrees of freedom may be present. Although the signal transmission system described herein is shown on the robot arm 10, it may be used with other mechanisms, such as articulated mechanisms or arms, serial mechanisms or arms, parallel mechanisms or arms, or like mechanisms or arms. However, for simplicity, the expression "robot arm" is used throughout, but in a non-limiting manner. The robot arm 10 is a serial articulated robot arm, having an end effector end 10A, i.e., the end at which an end effector is connected, and a base end 10B. The effector end 10A is configured to receive any appropriate tool, such as gripping mechanism or gripper, anthropomorphic hand, tooling heads such as screwdrivers, drills, saws, an instrument drive mechanism, camera, etc. As shown in FIG. 2, a port 10A' is at the effector end 10A, and may be any appropriate port, including a RJ45 connector, a M8 connector, a M12 connector, a pogo pin connector, etc. The port 10A' may use centrally-oriented and reversible (180 degree orientation change supported) spring-loaded connectors. The port 10A' enables high speed data transmission, enabled by the use of multiple of the signal transmission device of the present disclosure along the robot arm 10. For example, the signal transmission device described herein may enable the transmission of Ethernet signals, USB signals, Ethercat signals, via one or multiple high speed data buses. Transmissions speeds may be of 10 mbit/sec or more as a possibility. The high speed communication may be done wirelessly and converted to a wired interface at the end effector. The end effector secured to the effector end 10A is as a function of the contemplated use, and more than one end effector may be used (e.g., a camera may be used with a gripper, as one combination among many others). An interface 10A" may also be present, and may include buttons, an additional port, etc.

The base end 10B is configured to be connected to any appropriate structure or mechanism. The base end 10B may be rotatably mounted or not to the structure or mechanism. By way of a non-exhaustive example, the base end 10B may be mounted to a wheelchair, to a vehicle, to a frame, to a cart, to a robot docking station. Although a serial robot arm is shown, the joint arrangement of the robot arm 10 may be found in other types of robots, including parallel manipulators.

The robot arm 10 has a series of links 20, interconnected by motorized joint units 30 (for simplicity, only two shown in FIG. 1, but with numerous other motorized joint units 30 being present, e.g., at a junction between each link 20), at the junction between adjacent links 20. A bottom one of the links 20 is shown and referred to herein as a robot arm base link 20', or simply base link 20', and may or may not be releasably connected to a docking cradle.

The links 20 define the majority of the outer surface of the robot arm 10. The links 20 also have a structural function in that they form the skeleton of the robot arm 10 (i.e., an outer shell skeleton), by supporting the motorized joint units 30 and tools at the effector end 10A, with loads supported by the tools, in addition to supporting the weight of the robot arm 10 itself. Electronic components may be concealed into the links 20.

The motorized joint units 30 interconnect adjacent links 20, in such a way that a rotational degree of actuation is provided between adjacent links 20. According to an embodiment, the motorized joint units 30 may also connect a link to a tool at the effector end 10A, although other mechanisms may be used at the effector end 10A and at the base end 10B. For example, the link 20 at the effector end 10A may be described as a wrist, rotatable about its central axis, shown as X in FIG. 2. The motorized joint units 30 may also form part of structure of the robot arm 10, as they interconnect adjacent links 20.

The signal transmission device 40 is provided in one or more of the links 20, for establishing a communications link through the link 20. In an embodiment, each link 20 includes one of the signal transmission device 40, with the signal transmission devices 40 being serially connected from the base end 10B to the effector end 10A, such that an end effector and a base controller may be communicatively coupled, for example.

Figure 3:
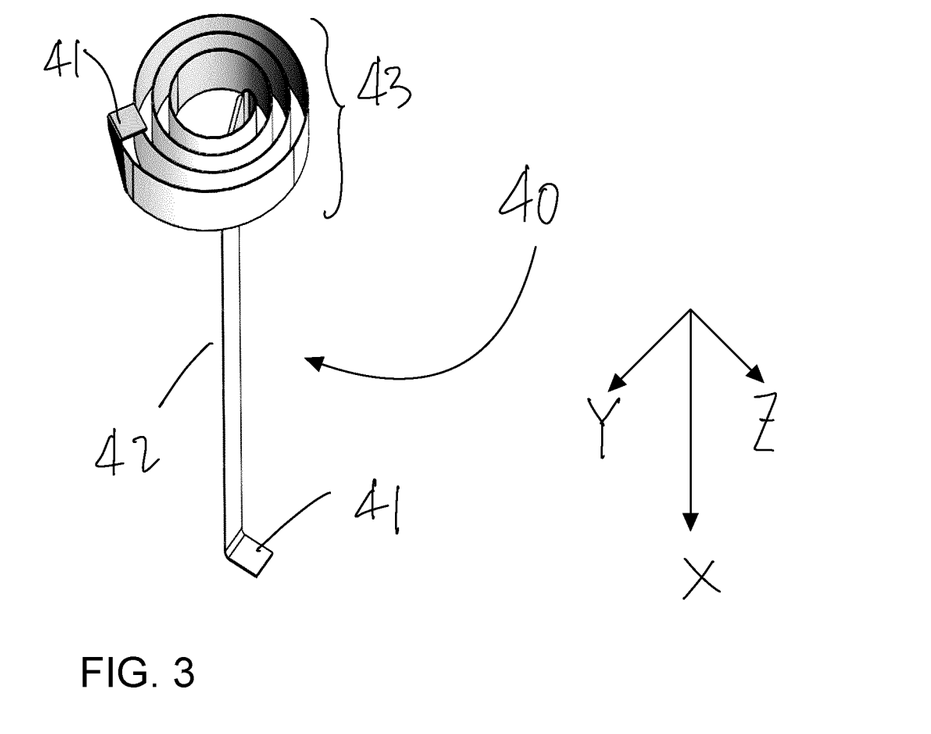
FIG. 3 is a perspective view of a signal transmission device for the articulated robot arm of FIG. 1.

Referring to FIG. 3, the signal transmission device 40 is shown in greater detail. In an embodiment, the signal transmission device has a tape-like body supporting circuitry, such as with multiple channels. For example, the tape-like body may be ribbon cable, flat multicore cable and/or geometrically as a clockspring or clock spring. The tape-like body may be flexible (i.e., elastically deformable). In an embodiment, there is no springing effect, in that the clock spring does not exert a substantial pulling action on its ends. The signal transmission device 40 has a pair of connectors 41 at its opposed ends. In an embodiment, the connectors 41 are flat connectors that may for example be a bend in the tape-like body of the signal transmission device 40, and that have circuit contacts. Other possible connectors 41 may include ZIP connectors, IDC connectors or other ribbon cable connectors. The flat connectors 41 shown in FIG. 3 are merely examples of connectors that may be used. The signal transmission device 40 may also have an elongated portion 42. The elongated portion 42 has any appropriate length, based on the length of the respective link 20, for example. The elongated portion 42 is shown as being straight, but may be bent or feature a fold towards a defined direction. For example, if the signal transmission device 40 is in an elbow link 20 (as present in the robot arm 10 of FIG. 1), the elongated portion 42 may be bent, curved or precisely folded to conform to the shape of its link.

The signal transmission device 40 may further include a coiled portion 43 at the end of the elongated portion 42. The coiled portion 43 may be known as a spiral-wound portion, with at least two loops (more than three loops shown in FIG. 3). In an embodiment, a bend in the tape-like body causes the elongated portion 42 to transition to the coiled portion 43. The elongated portion 42 and the coiled portion 43 may be said to have a continuous integral ribbon cable construction, in that they may be constituted of a single ribbon cable or equivalent, shaped in the manner shown in FIG. 3. A referential system X-Y-Z is provided to explain a geometry of the signal transmission device 40, and is provided merely to assist the geometry. The elongated portion 42 extends along direction X. The coiled portion 43 lies between a pair of Y-Z planes, i.e., planes parallel to the Y-Z axes. In an embodiment, direction X (or a vector of direction X) is normal to the Y-Z planes in which the coiled portion 43 lies for the elongated portion 42 to extend generally normally to the coiled portion 43, but the elongated portion 42 may also extend in a direction that is not normal to the Y-Z planes. In an embodiment, the elongated portion 42 may be rotated about an axis parallel to direction X, as shown as e, for example as the elongated portion 42 rotates with its respective link 20. If the connector 41 at the end of the coiled portion 43 is fixed during a rotation of the elongated portion 42, a radial dimension of part of the coiled portion 43 varies to allow the rotation. Stated differently, during use, the connectors 41 rotate relative to one another, about direction X, and the coiled portion 43 allows such rotation by changing its radial dimensions in its coil.

Figure 4:
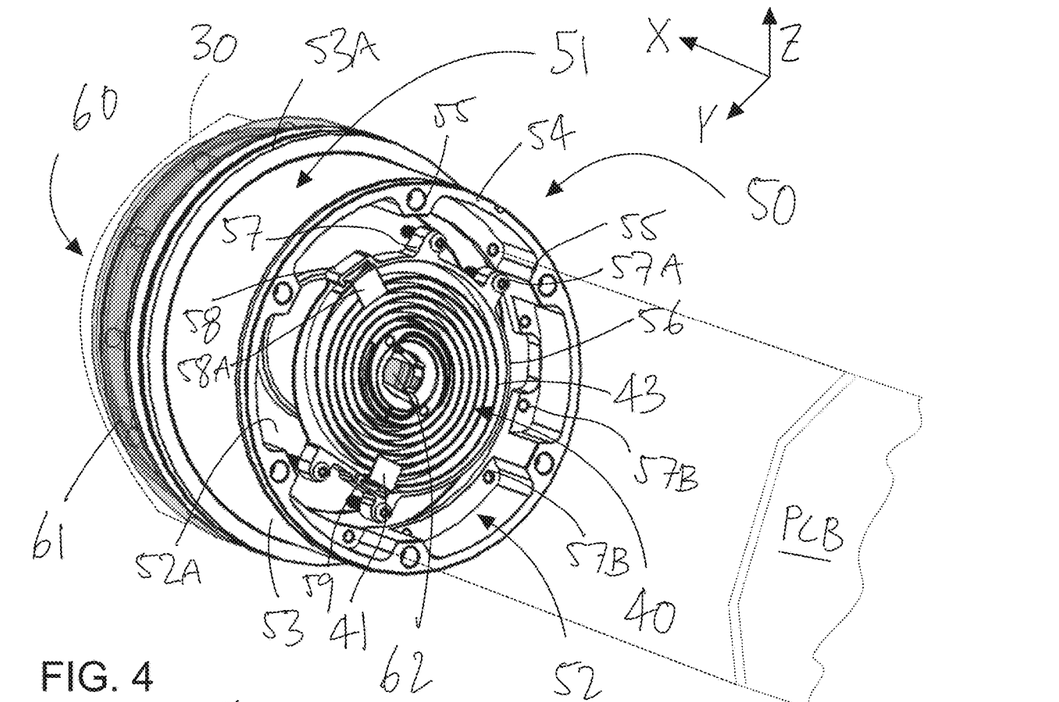
FIG. 4 is a perspective view of the signal transmission device as installed in a joint of the articulated robot arm of FIG. 1.
Figure 5:
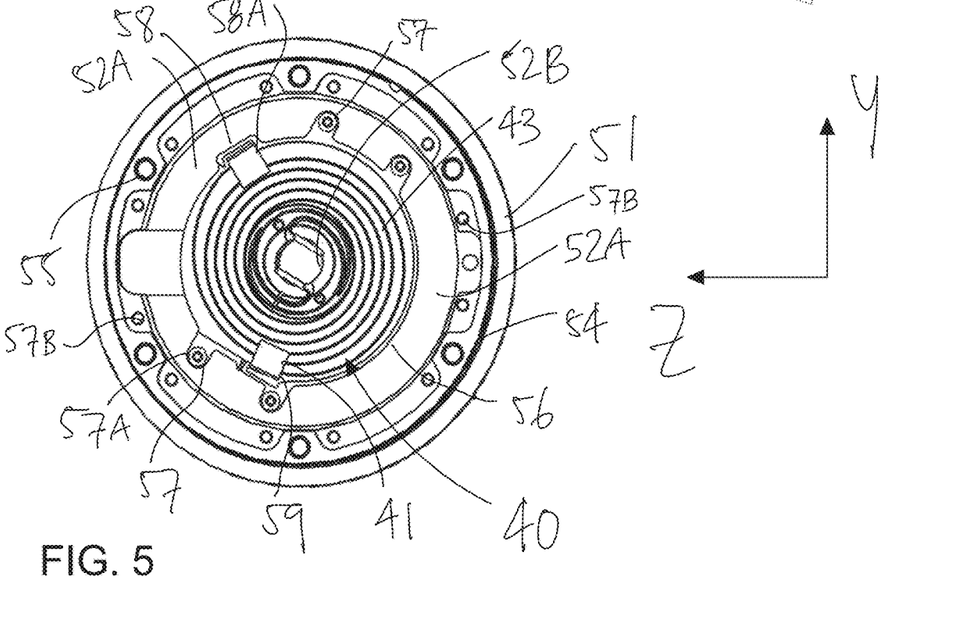
FIG. 5 is a face view of the signal transmission device and link of FIG. 4.

Referring to FIGS. 4 and 5, an installation of the signal transmission device 40 in structural components of links 20 is shown, with the XYZ referential system being the same as in FIG. 3. In FIGS. 4 and 5, a pair of adjacent ones of the links 20 are illustrated by shells 50 and 60, the shells 50 and 60 being rotatably connected to one another, for instance by one of the motorized joint units 30 (FIG. 1), concealed from view in FIG. 4 by the shells 50 and 60. In an embodiment, it may be said that the shells 50 and 60 are part of a motorized joint unit 30, as they form the relatively rotatable structural members of a motorized joint unit 30. In an embodiment, structural link members (such as visible in FIG. 1) are secured to shells 50 and 60. The shell 50 is part of or may be integrally connected to one of the links 20, and the shell 60 is part of or may be integrally connected to the adjacent link 20, with the rotational degree of freedom between the shells 50 and 60. The rotational degree of freedom between the shells 50 and 60 may have its axis parallel or quasi parallel to direction X. The shells 50 and 60 are structural link members, in that they are structural parts of the links 20. The expression shell is used to express the notion that shells 50 and 60 form a hard outer case for some of the components of the robotic arm 10, including parts of the signal transmission devices 40.

The shell 50 may have a tubular construction. The tubular construction may be embodied by an annular body portion 51. A cavity 52 is open at an end of the annular body portion 51, and may be delimited by a support surface 52A, for receiving the coiled portion 43 of the signal transmission device 40. The support surface 52A may define a plane that would correspond to one of the Y-Z planes in FIG. 3. A central hole 52B may be defined in the support surface 52A, through which the central hole 52B may communicate with a passage that would correspond to direction X in FIG. 3.

The tubular configuration of the annular body portion 51 may be used so as to conceal numerous components of one of the motorized joint unit 30 (FIG. 1), hidden from FIGS. 4 and 5 by the support surface 52A. The annular body portion 51 may have a monoblock construction, or may be an assembly of parts. According to an embodiment, the annular body portion 51 defines a peripheral wall 53 that may have a generally cylindrical shape, as shown. The peripheral wall 53 may have other shapes, such as frustoconical. The peripheral wall 53 may be smooth and/or may have surface features, e.g., connector holes, flange 53A, etc. A rim 54 is at an axial end of the peripheral wall 53. The peripheral wall 53 extends beyond the support surface 52A to define the cavity 52, in which the coiled portion 43 of the signal transmission device 40 is received. Blocks 55 may optionally extend inwardly from the peripheral wall 53. The blocks 55 may have tapped holes for receiving fasteners. The blocks 55 and fasteners may be used to secure a motorized joint unit 30, or other structural component, to the shell 50.

Still referring to FIGS. 4 and 5, a ring structure 56 may project from the support surface 52A. The ring structure 56 may be integrally connected to the support surface 52A, or may be attached to it. During assembly of the robot arm 10, the support surface 52A and the ring structure 56 are fixed to one another, so as to rotate with one another. The ring structure 56 defines a receptacle with the support surface 52A, for lodging the coiled portion 43 of the signal transmission device 40. The receptacle communicates with the central hole 52B. The ring structure 56 may be generally circular in shape, so as to surround the receptacle, and the coiled portion 43 therein. The ring structure 56 is an arrangement among others to hold the coiled portion 43 captive in the shell 50, with other arrangements defined by posts, abutments, etc. In another embodiment, the coiled portion 43 abuts against the peripheral wall 53.

In an embodiment, the ring structure 56 may have various components, that may be integral with the ring structure 56, or that may be standalone as well. In a variant, fastener blocks 57 are integral with and project from the ring structure 56. The fastener blocks 57 are on an exterior of the ring structure 56. The fastener blocks 57 and fasteners 57A (e.g., set screws, bolts) are provided to connect components to the ring structure 56. For example, the fastener blocks 57 are used for securing a PCB to the shell 50, in such a way that the printed-circuit board is conductively connected to the signal transmission device 40. An alternative to fastener blocks 57 would be posts projecting upwardly from the support surface 52A. As yet another possibility, the PCB is connected to the shell 50 by way of tapped holes 57B. The PCB may generally lie in the Y-Z plane.

Tab block(s) 58 may also be present. The tab block 58 may be an integral part of the ring structure 56, as a possibility. The tab block 58 may receive a tab 58A, or like clip. The tab 58A may be a L-shaped tab, for example, that would define an abutment extending in another Y-Z plane (FIG. 3). Accordingly, when the coiled portion 43 of the signal transmission device 40 is in the receptacle, the coiled portion 43 is held captive between the support surface 52A and the tab 58A. The tab block 58 and tab 58A are one contemplated solution among others to hold the coiled portion 43 captive in the shell 50, with other possibilities including using the printed-circuit board, a plate, a disc, etc. The tab 58A allows the radial dimension variations of the coiled portion 43.

A slot 59 may also be defined in the ring structure 56, for attachment of the coiled portion 43 of the signal transmission device 40 at its connector 41. The slot 59 may open to the interior of the receptacle. The slot 59 may be viewed as a clocking feature as it holds the connector 41 at a fixed clock position. Other holding features may be present, such as a clip located at or near the junction between the elongated portion 42 and the coiled portion 43. The connector 41 of the signal transmission device 40 is fixed when fitted in the slot 59. Moreover, the slot 59 holds the connector 41 in such a way that it is above the coiled portion 43, and above or level with a Y-Z plane of the coiled portion 43. Therefore, if a printed-circuit board is fixed to the fastener blocks 57 or held in similar manner to hover over the cavity 52, it may be in conductive contact with the connector 41, for a communications link to be formed. The slot 59 in the ring structure 56 is one solution among others to attach the connector 41 at the end of the coiled portion 43 to the shell 50. Other configurations may include strap(s), an arc, a bridge, etc.

Referring to FIG. 4, an annular body portion 61 of the shell 60 is shown. The annular body portion 61 is continuous with the annular body portion 51 of the shell 50, with the capacity for rotation relative to one another. The shell 60 may also have a hollow shaft 62 or like central tubular structure, that is aligned with the central hole 52B. Therefore, when the signal transmission device 40 is installed in the shells 50 and 60, the elongated portion 42 of the signal transmission device 40 extends along the hollow shaft in such a way that the connector 41 at the end of the elongated portion 42 is exposed at the end of the shaft 62, for serial communication with a printed-circuit board, or with another signal transmission device 40, etc.

In a variant, the connector 41 at the elongated end 42 of the signal transmission device 40 is fixed so as to rotate with the shell 60. Therefore, both connectors 41 of the signal transmission device 40 are secured to a respective one of shells 50 and 60. When the motorized joint unit 30 imparts a relative rotation between the shells 50 and 60, the coiled portion 43 of the signal transmission device 40 varies in diameter to allow the rotation of the shells 50 and 60. For example, the coiled portion 43 may have a curve radius from 12 mm to 30 mm, inclusively. The variation in diameter may be for any coil segment of the coiled portion 43. More particularly, the coiled portion 43 may be described as being a spiral, as observed from FIG. 4, with numerous loops. The variation in diameter may be for a single one of a loop, a portion of a loop, a more than one loop. The coiled portion 43 has a shape to preserve its spiral configuration and to prevent the creation or presence of kinks.

The use of the signal transmission devices 40 to establish a serial communications link from the base end 10B to effector end 10A in the robot arm 10 allows high bandwidth to be run internally in the robot arm 10. For example, the signal transmission devices 40 may be selected to enable at least a Gigabit bandwidth. The signal transmission device 40 is an impedance-controlled multiline rotary connection that features a flex cable construction. The impedance control may be passive or active. In an embodiment, the signal transmission device 40 is designed to handle multiple ethernet or other communication busses (e.g., one or more) at speeds of 100 mBit, 1 Gbit or faster, in a compact, highly integrated form directly in the links 20 (e.g., Ethercat, USB Superspeed, etc.). The coiled portion 43 of the signal transmission device 40 may have a sufficient length so as not to constraint rotation to one revolution, so as not limit robot motion, i.e., at least one revolution is possible. In an embodiment, from a reference orientation between the shells 50 and 60, the coiled portion 43 of the signal transmission device 40 may have a sufficient length to allow ±360 degrees, i.e., one revolution to either direction of the reference orientation, and thus a total of at the least two revolutions.

Figure 7:
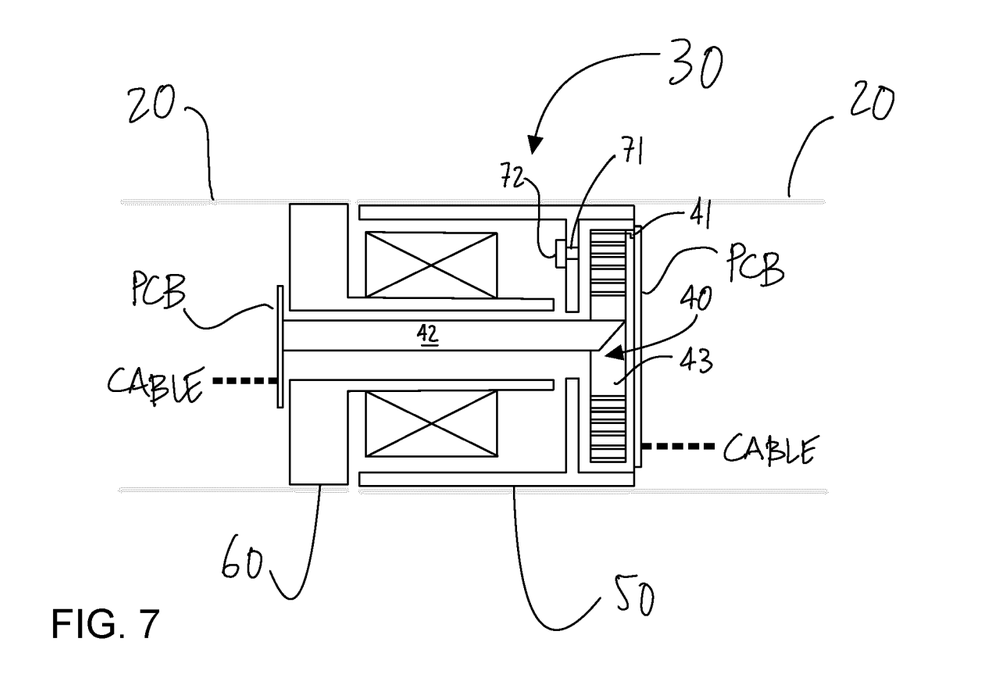
FIG. 7 is a schematic view of an exemplary motorized joint unit using the signal transmission device.

In an embodiment, with reference to FIG. 7, the assembly of FIGS. 4 and 5 is one of the motorized joint units 30, and includes the signal transmission device 40, passing through the central passage as explained above. On the side of the shell 50, the illustrated PCB, to which the connector 41 of the coiled portion 43 is in electric contact, may include a CPU or like controller, a telecommunications chip (e.g., Ethernet switch). The signal transmission device 40 extends from the shown PCB, to another PCB connected to the shell 60. Hence, the elongated portion 42 is straight. The PCBs at opposed ends of the motorized joint unit 30, i.e., on the shell 50 and the shell 60, are then interconnected by wire, from one motorized joint unit 30 to another. The motorized joint unit 30 may be said to have structural members rotatably coupled to one another, with a first one of the structural members defining a central passage. A communications link is in the motorized joint unit 30 arm for signal transmission along the robotic arm, the communications link including a signal transmission device having a coiled portion, with ends of the coiled portion adapted to be connected to parts of the communications link, whereby the coiled portion is a segment of the communications link. The coiled portion has one of its ends connected to the second one of the structural members to rotate with the second one of the structural members, the other of the ends of the coiled portion connected to a component associated with the first one of the structural members through the central passage to rotate with the first one of the structural members, at least a portion of the coiled portion expanding or contracting radially during relative rotation between the pair of structural members.

Figure 6:
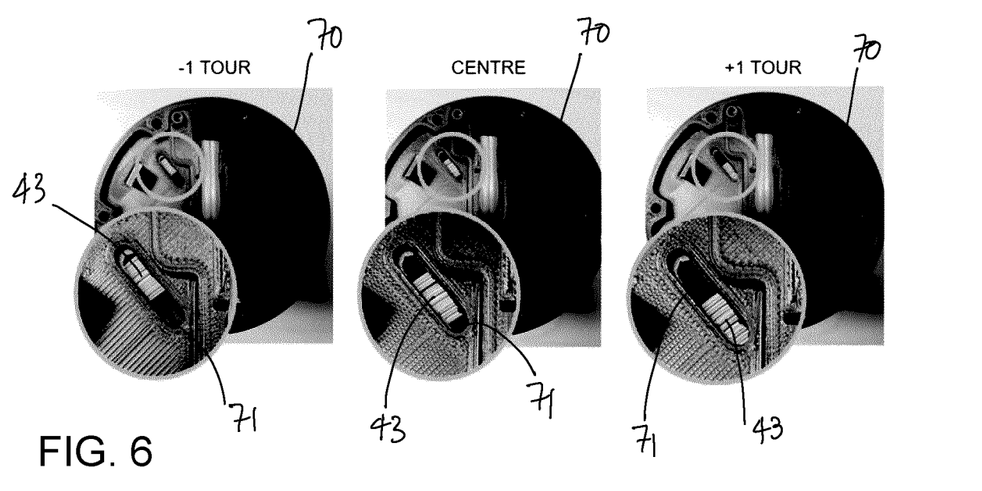
FIG. 6 are a series or schematic views showing a window for monitoring the signal transmission device.

Referring to FIG. 6, the arrangement of the signal transmission device 40 in the robot arm 10 may also include means for indexing/aligning the motorized joint unit 30 and signal transmission device 40 together for maintenance purposes. A cover plate 70 may be installed onto the shell 60 so as to conceal the coiled portion 43 in the receptacle defined above. A window 71 may be present in the cover plate 70 (or in the wall featuring the support surface 52A), for the coiled portion 43 to be visible. The position of the coiled portion 43 as seen through the window 71 allows a visual determination of the clocking of the shell 50 relative to the shell 60. For example, the left-hand side figure shows a maximum possible expansion of the coiled portion 43. The right hand side figure shows a maximum possible contraction of the coiled portion 43. The central image shows a neutral position from which rotation is possible in either direction. The window 71 may be used for visual alignment at assembly. As another option, an optical sensor 72 (FIG. 7) may be present to monitor the signal transmission device 40 through the window 71, and assist in managing the clocking of the shells 50 and 60 relative to one another.

By allowing for higher speed internal data communication through a serial connection of signal transmission devices 40, more advanced and intelligent end of arm sensors, such as high speed and high resolution cameras, depth sensors, etc, and application-specific tooling (ex: complex and force/controlled assembly, inspection, finishing tooling) are possible without external wiring. The signal transmission device 40 may further include or may operate in conjunction with repeaters, amplifiers and/or switches for different protocols and speeds.

In an embodiment, the signal transmission device 40 has the coiled portion 43, but does not include the elongated portion 42 integral with the coiled portion 43. For example, the coiled portion 43 may be electrically connected at its central end (within the coil) to a circuit component that extends along the joint. For example, the coiled portion 43 may have a connector 41 at its center, such a connector 41 being operatingly connected to a cable, printed circuit, etc. In another embodiment, a communications link of the robot arm 10 has a sequence of PCB-signal transmission device 40-PCB-cable (e.g., Ethernet)-PCB-signal transmission device 40-PCB-cable.... The expression "communications link" is used as the signal transmission device(s) 40 is(are) part of a wired system by which signals and power are sent between components of the robot arm 10, such as between a base controller and an end effector, or any other component pair (e.g., a receiver/transmitted in the robot arm 10 and the end effector, or plug or port at the effector end 10A). In a variant, each link 20 has at least one PCB and signal transmission device 40. An exception could be for the base link 20' and wrist, that may have only a PCB, only a signal transmission device 40, or two PCBs for a single signal transmission device 40, for example. The communications link may be said to be without slip rings from base to effector end.

The invention claimed is:

1. A robotic arm comprising:
   at least pair of structural members rotatably coupled to one another for rotation about an axis of rotation, with a first one of the structural members defining a central passage generally extending along the axis of rotation;
   a communications link at least partially within the robotic arm for signal transmission within the robotic arm, the communications link including
   a signal transmission device having a coiled portion, with ends of the coiled portion adapted to be connected to parts of the communications link, whereby the coiled portion is a segment of the communications link, and an elongated portion extending from one of the ends of the coiled portion into the central passage,
   wherein the coiled portion has one of its ends connected to a second one of the structural members to rotate with the second one of the structural members, the elongated portion connected to a component associated with the first one of the structural members through the central passage to rotate with the first one of the structural members, at least a portion of the coiled portion expanding or contracting radially during relative rotation between the pair of structural members.

2. The robotic arm according to claim 1, wherein the second one of the structural members defines a receptacle, the coiled portion being received in the receptacle.

3. The robotic arm according to claim 2, wherein at least one tab projects from a wall of the receptacle to hold the coiled portion captive in the receptacle.

4. The robotic arm according to claim 2, wherein one of the ends of the coiled portion is fixed to a wall of the receptacle.

5. The robotic arm according to claim 1, wherein the signal transmission device has a ribbon cable construction.

6. The robotic arm according to claim 5, wherein the communications link has one or more data communication buses enabling data communication at rates from 10 mbit/see to 20 gbit/see inclusively.

7. The robotic arm according to claim 1, wherein the coiled portion is impedance controlled actively or passively.

8. The robotic arm according to claim 1, wherein the elongated portion has an end fixed in rotation to the first one of the structural members.

9. The robotic arm according to claim 1, wherein the elongated portion and the coiled portion have a continuous integral ribbon cable construction.

10. The robotic arm according to claim 8, wherein the coiled portion lies in a plane, and the elongated portion extends from the coiled portion in a direction normal to the plane.

11. The robotic arm according to claim 1, wherein the coiled portion lies in a plane, and wherein an axis of rotation between the pair of structural members is normal to the plane.

12. The robotic arm according to claim 1, wherein a window is defined in a cover plate on one of the structural members to monitor the coiled portion.

13. The robotic arm according to claim 1, wherein the communications link includes at least one of a repeater, an amplifier, a switch.

14. The robotic arm according to claim 1, wherein a curve radius of the coiled portion is between 12 mm and 30 mm.

15. The robotic arm according to claim 1, wherein the communications link has a high speed communication port or connector at an end effector interface.

16. The robotic arm according to claim 1, wherein the coiled portion allows for rotational movement between the pairs of structural members of at least one complete revolution.

17. The robotic arm according to claim 1, wherein the central passage is defined by a hollow shaft of the first one of the structural members.

18. The robotic arm according to claim 17, wherein a motorized joint unit surrounds the hollow shaft.

19. A robotic arm comprising:
- at least pair of structural members rotatably coupled to one another for rotation about an axis of rotation, with a first one of the structural members having a hollow shaft defining a central passage generally extending along the axis of rotation
- a motorized joint unit surrounding the hollow shaft and configured to drive a rotation between the structural members about the axis of rotation;
- a communications link at least partially within the robotic arm for signal transmission within the robotic arm, the communications link including
- a signal transmission device having a coiled portion, with ends of the coiled portion adapted to be connected to parts of the communications link, whereby the coiled portion is a segment of the communications link, and an elongated portion extending from one of the ends of the coiled portion into the hollow shaft, wherein the coiled portion has one of its ends connected to a second one of the structural members to rotate with the second one of the structural members, the elongated portion connected to a component associated with the first one of the structural members through the hollow shaft to rotate with the first one of the structural members, at least a portion of the coiled portion expanding or contracting radially during relative rotation between the pair of structural members.

* * * * *